United States Patent [19]

Tietz et al.

[11] Patent Number: 4,563,628
[45] Date of Patent: Jan. 7, 1986

[54] SUPERVISION SYSTEM FOR MONITORING THE CONDITION OF A BATTERY AND A SERIES-CONNECTED FUSE

[75] Inventors: Joseph G. Tietz, Teaneck; John M. Wynne, Oak Ridge, both of N.J.

[73] Assignee: Baker Industries, Inc., Parsippany, N.J.

[21] Appl. No.: 643,950

[22] Filed: Aug. 24, 1984

Related U.S. Application Data

[63] Continuation of Ser. No. 433,604, Oct. 12, 1982, abandoned.

[51] Int. Cl.$^4$ .............................................. H02J 7/00
[52] U.S. Cl. ........................................ 320/20; 320/21; 320/48; 340/636; 307/66
[58] Field of Search ............... 320/48, 20, 21; 307/64, 307/66; 340/636

[56] References Cited

U.S. PATENT DOCUMENTS

| | | | |
|---|---|---|---|
| 3,700,997 | 10/1972 | Smith | 320/14 |
| 4,137,493 | 1/1979 | Smith | 320/48 |
| 4,225,815 | 9/1980 | Lind et al. | 320/20 |
| 4,303,878 | 12/1981 | Masutani | 320/48 |
| 4,342,022 | 7/1982 | Nichol | 320/48 |

Primary Examiner—Peter S. Wong
Assistant Examiner—Anita M. Ault
Attorney, Agent, or Firm—James E. Tracy

[57] ABSTRACT

The condition of a rechargeable battery, which is employed as a backup d-c power supply for a load in the event of an emergency and is normally charged by a d-c charging voltage through a series-connected protective fuse, is monitored by momentarily reducing the charging voltage and effectively sensing or measuring the voltage across the series-connected fuse and battery during the momentary reduction, while not affecting the load. If the battery is connected and is functioning properly and if the fuse is connected and is continuous, the sensed voltage will exceed a predetermined desired threshold level, and this normal condition may be visually and/or audibly indicated. On the other hand, if the battery is disconnected, or if the battery voltage is abnormally low, or if the fuse is absent or is open, then the sensed voltage will fall below the desired threshold level, signifying a trouble condition. When such a condition is detected, a trouble indicator provides an appropriate visual and/or audible signal.

1 Claim, 1 Drawing Figure

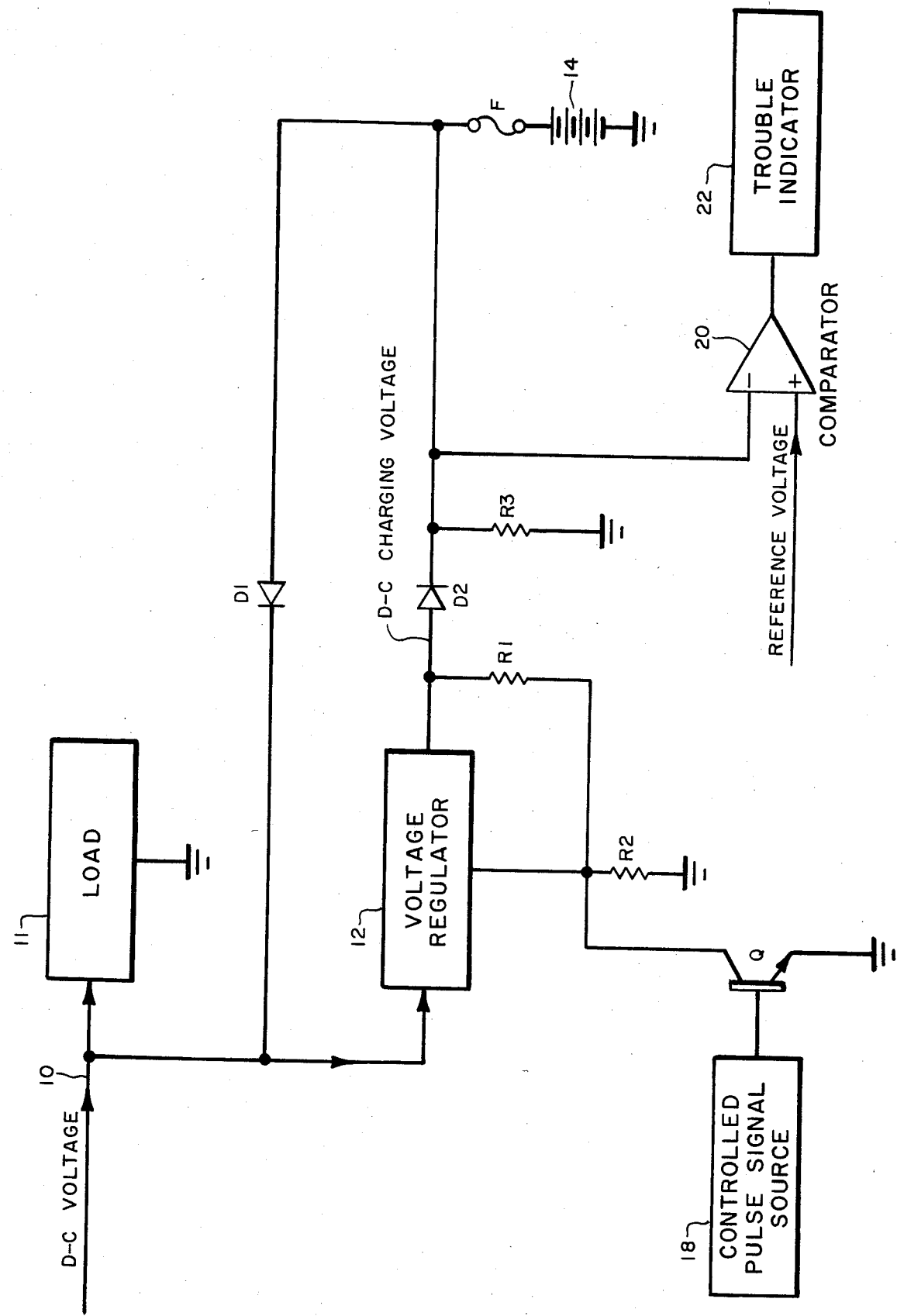

ise fuse. The sensing means, during the momentary reduction of the charging voltage, effectively senses the voltage across the series combination of the fuse and the battery to determine whether the fuse is continuous and is connected in series with the battery. If a trouble condition is found relative to the fuse, a trouble indication will be produced.

SUPERVISION SYSTEM FOR MONITORING THE CONDITION OF A BATTERY AND A SERIES-CONNECTED FUSE

This is a continuation of application Ser. No. 433,604 filed Oct. 12, 1982, now abandoned.

BACKGROUND OF THE INVENTION

This invention relates to a battery charging and supervision system for monitoring the state of a battery being charged and a series-connected protective fuse in order to detect malfunctions in operation. More specifically, the system of the invention monitors the presence and voltage of the battery, and the presence and continuity of the protective fuse.

There are many environments where a d-c operating voltage, required to power a load in an emergency, is derived from a rechargeable battery which is continuously being charged by a battery charger, the charger in turn being energized by the primary power source, such as an a-c line voltage source. An arrangement of this type provides a relatively stable, non-interruptible d-c voltage and is particularly well suited for powering computer equipment which usually requires the continuous application of an operating potential to operate properly. If there is a power loss, even though momentary, the operation of the computer equipment may be deleteriously affected.

In many cases it is desirable to supervise or monitor the rechargeable battery to make certain that the standby or backup d-c power supply for emergency use is functioning properly, and to provide a signal of some type when there is a malfunction. Such battery supervision is most helpful when the battery, and the load to be powered thereby, are incorporated in a security protection system or a fire detection system. A fuse is ordinarily connected in series with the battery and opens in the event that either the charging current or the load current exceeds a prescribed limit. It is thus desirable that the supervision system also monitor the condition of the protective fuse to determine that the fuse is actually connected in the circuit and is effective, namely, is continuous.

Monitoring a battery and a series-connected fuse is especially difficult when a d-c charging voltage is constantly applied to the series combination, since the charging voltage itself will interfere with testing of the battery and fuse. The battery voltage could be abnormally low or the fuse could be blown or open, and the monitor would provide a false test result indicating that the battery voltage exceeds the desired threshold level and that the fuse is not blown and is continuous. This problem has been overcome in a prior system by utilizing unfiltered, full-wave rectified a-c voltage for charging the battery, which is treated as a large storage capacitor. In the battery's presence and when its voltage is at the desired level, and when the fuse is present and is continuous, the output of the battery charger will essentially be a d-c voltage with very little ripple. In the battery's absence or when its voltage is abnormally low, or when the fuse is open, the ripple on the output of the battery charger will be very large. Thus, the state of the battery and fuse can easily be determined by a sensing circuit.

The problem remains, however, if the d-c charging voltage has no significant ripple component and has a relatively constant instantaneous amplitude, as is the case when the d-c voltage is derived from rectified a-c line voltage which has been filtered. The present invention is directed to the solution of the problem when a substantially ripple-free d-c charging voltage is employed. Successful monitoring of the battery and fuse is achieved, with such a d-c charging voltage, in the present invention by means of a unique supervision system of relatively simple and inexpensive construction.

SUMMARY OF THE INVENTION

The supervision system of the invention monitors a rechargeable battery, which provides a d-c operating potential for powering a load, to detect if the battery voltage falls below a predetermined desired threshold level. The system comprises means for applying a d-c charging voltage to the battery to charge the battery and maintain its voltage above the desired threshold level. Means are included for momentarily reducing the charging voltage and, during that momentary reduction, sensing means effectively senses or measures the battery voltage to determine if it is below the threshold level. A trouble indication is provided when the battery voltage drops below the threshold.

In accordance with another aspect of the invention, the supervision system also monitors the condition of a protective fuse, which is series-connected with the battery, to detect whether the fuse is present and is effective. The sensing means, during the momentary reduction of the charging voltage, effectively senses the voltage across the series combination of the fuse and the battery to determine whether the fuse is continuous and is connected in series with the battery. If a trouble condition is found relative to the fuse, a trouble indication will be produced.

DESCRIPTION OF THE DRAWING

The features of the invention which are believed to be novel are set forth with particularity in the appended claims. The invention may best be understood, however, by reference to the following description in conjunction with the accompanying drawing which schematically illustrates a battery and fuse supervision system constructed in accordance with the present invention.

DESCRIPTION OF THE PREFERRED EMBODIMENT

Line 10 provides a d-c voltage which may be derived by a rectifier-filter to the input of which is applied a-c power line voltage. Due to the filtering action, the d-c voltage on line 10 will have a relatively constant instantaneous amplitude and no appreciable ripple component. Of course, any appropriate d-c power source may be employed to produce the d-c voltage for line 10. For example, it could be developed by a diesel engine-generator. It will be assumed, however, that regardless of the power source the d-c voltage will be substantially ripple-free.

Line 10 directly connects to load 11 to apply a d-c operating potential thereto, the d-c voltage thereby constituting the primary power source for the load. Unless there is a power failure resulting in a loss of d-c voltage on line 10, load 11 will be powered by the voltage received over line 10. Under those conditions, the d-c voltage on line 10 will be higher than the voltage of battery 14 and isolating diode D1 will be reverse biased. Hence, until there is an emergency requiring backup or stand-by d-c power for load 11 from battery 14, no load current will flow from the battery and through fuse F and diode D1 to the load.

Of course, load 11 may constitute any circuitry which operates or functions in response to a d-c voltage. The invention is particularly attractive where the load includes computer circuitry and detectors in a fire detection system or in a security protection system. In such an environment, battery 14 may actually include a set or bank of separate batteries connected together in series and/or in parallel. Obviously, only one battery is shown in the drawing to simplify the disclosure. The nominal voltage of battery 14, which is determined by the requirements of load 11, may take any appropriate level. In one installation, a 24 volt battery was employed.

In order to maintain backup battery 14 fully charged so that it is available in the event of a loss of primary d-c power, voltage regulator 12, whose input is connected to line 10, produces a d-c charging voltage for the battery. Voltage regulator 12 is of the type where the regulator output voltage may be changed by adjusting output resistor R2 which is in series with output resistor R1. Resistor R2 will be appropriately sized in order to produce a d-c charging voltage of a desired magnitude at the output of regulator 12 for charging battery 14. Transistor Q, which constitutes a solid state switch, will normally be turned off or non-conductive so the charging voltage will be determined by the combination of resistors R1 and R2. The coupling circuit from regulator 12 to battery 14 and fuse F includes a series-connected isolating diode D2 and a shunt-connected sensing resistor R3. Under normal conditions regulator 12 produces a d-c voltage for charging battery 14 and maintaining its voltage above a predetermined desired threshold level. In the installation previously mentioned where a 24 volt battery was employed, the charge cycle covered the range from 21 to 28 volts. Voltage regulator 12 ensures that the battery voltage never exceeds the upper limit.

In order to test battery 14 and fuse F, controlled pulse signal source 18 applies a positive-going pulse to the base of transistor Q to momentarily turn the transistor on, thereby essentially shorting out resistor R2 and momentarily reducing the d-c charging voltage. For example, if battery 14 is nominally 24 volts the output voltage of regulator 12 preferably would be decreased to about 15 volts when resistor R2 is shorted out. Pulse signal source 18 may include an oscillator or cycling apparatus so that periodically recurring pulses are produced for application to transistor Q to effect repetitive testing. In the preferred embodiment, each pulse has a width of around 5 milliseconds and only one pulse is produced every three seconds. In this way, the time duration of each momentary reduction of the charging voltage is extremely small compared to the time interval between successive tests.

If fuse F is present and is not open and if battery 14 is functioning properly and is charged to at least 21 volts, when the charging voltage momentarily drops to 15 volts on the anode side of isolating diode D2 the voltage across the series combination of the battery and fuse will appear across sensing resistor R3. Of course, since fuse F has substantially no resistance the full battery voltage will be applied to resistor R3. Voltage comparator 20, which compares the voltage across sensing resistor R3 with a reference voltage (for example, 18 volts) representing the predetermined desired threshold level for the battery, serves as a sensing means for effectively sensing or measuring the battery voltage during the reduction of the charging voltage to detect if the battery voltage falls below the desired threshold level. With a continuous fuse F and normal battery voltage, the voltage at the inverting or (−) input of comparator 20 will be greater than (namely, positive relative to) the reference voltage (18 volts) at the non-inverting or (+) input, as a result of which the output voltage of comparator 20 will be relatively low (logic 0). Trouble indicator 22, which responds to and is controlled by voltage comparator 20, will therefore provide an indication (visual and/or audible) signifying the normal condition of the battery and fuse.

It is to be noted that since load 11 is isolated from the momentary reductions of the charging voltage, the load will not be affected by those reductions and will receive a continuous, uninterrupted d-c operating voltage. This feature is particularly important when the load includes computer circuitry.

Assume now that during a momentary reduction of the charging voltage down to 15 volts, the battery has a voltage below the 18 volts desired level or the fuse has blown or has been disconnected. The voltage across sensing resistor R3 will now be relatively low compared to its high level during normal conditions and the inverting inut of comparator 20 will be less than (namely, negative with respect to) the 18 volts reference voltage at the non-inverting input. As a consequence, the output of the comparator will switch to logic 1 and provide a relatively high output voltage. Trouble indicator 22 responds to the logic 1 output of comparator 20 to produce an appropriate visual and/or audible signal to indicate that a trouble condition exists. Preferably, a latch circuit would be included in trouble indicator 22 to maintain the trouble signal on after the test is completed and the d-c charging voltage returns to its normal magnitude. The signal could appear at some control station, remote from the site of the battery and the equipment operated thereby which site may be unattended. Operating personnel may then be dispatched from the control station to the malfunctioning remote station to correct the problem with the battery and/or the fuse.

While a particular embodiment of the invention has been shown and described, modifications may be made, and it is intended in the appended claims to cover all such modifications as may fall within the true spirit and scope of the invention.

We claim:

1. A battery and fuse supervision system for monitoring the condition of a rechargeable battery and a series-connected protective fuse to detect whether the battery is present and connected, whether the battery voltage is abnormally low, and whether the fuse is present and is effective, wherein the battery and fuse are connected, via a series-connected isolating diode, to a load to provide backup d-c power for the load in the event of a failure of a primary d-c power supply which normally applies to the load a d-c operating voltage greater than the battery voltage, thereby reverse biasing the isolating diode so that normally no load current flows from the battery, said supervision system comprising:

a voltage regulator having its input connected to the primary d-c power supply and having first and second series-connected output resistors across which resistors is provided a d-c charging voltage having an amplitude exceeding a predetermined reference level;

a sensing resistor shunt-connected across the series combination of the fuse and the battery;

a coupling circuit, including a series-connected isolating diode, for applying the d-c charging voltage from said voltage regulator to said sensing resistor and, through the fuse, to the battery to charge the battery normally to the charging voltage;

a solid state switch shunt-connected across said second output resistor of said voltage regulator;

means for periodically momentarily turning said solid state switch on to essentially short out said second output resistor in order to periodically momentarily reduce the charging voltage to a level below the reference level so that the voltage across said sensing resistor, during each momentary reduction, will normally be isolated from and not affected by the charging voltage and will be equal to and reflect the battery voltage, the time duration of each momentary reduction of the charging voltage being extremely small compared to the time interval between successive reductions, wherein the voltage across said sensing resistor is relatively high when the charging voltage is at its normal magnitude and the battery is being charged and is also relatively high when the battery voltage is above the reference level, and the fuse is present and continuous, but the charging voltage is at its reduced magnitude;

and wherein the voltage across said sensing resistor is relatively low when the battery voltage is below the reference level, or the fuse is open or disconnected, at the same time that the charging voltage is at its reduced level;

a voltage comparator for comparing the voltage across said sensing resistor with a reference voltage, representing the reference level, to determine, during each momentary reduction of the charging voltage, whether the sensing resistor voltage is relatively high, thereby indicating that the battery voltage is above the reference level and that the fuse is connected and is continuous, or is relatively low, thereby signifying that the battery voltage is below the reference level or that the fuse is discontinuous or is disconnected;

and indicator means, controlled by said voltage comparator, for providing a trouble indication when the sensing resistor voltage is relatively low.

* * * * *